United States Patent [19]
Kraszewski et al.

[11] Patent Number: 5,554,935
[45] Date of Patent: Sep. 10, 1996

[54] MASS OR WEIGHT DETERMINATION OF ARBITRARILY-SHAPED DIELECTRIC OBJECTS BY MICROWAVE RESONATOR MEASUREMENTS

[75] Inventors: Andrzej W. Kraszewski; Stuart O. Nelson, both of Athens, Ga.

[73] Assignee: The United States of America, as represented by the Secretary of Agriculture, Washington, D.C.

[21] Appl. No.: 416,405

[22] Filed: Apr. 3, 1995

[51] Int. Cl.$^6$ ................................................ G01R 27/04
[52] U.S. Cl. ........................................ 324/637; 324/633
[58] Field of Search ................................ 324/637, 647, 324/717, 633, 644, 632, 638, 642, 527, 533, 639, 207

[56] References Cited

U.S. PATENT DOCUMENTS

| | | | |
|---|---|---|---|
| 3,715,667 | 2/1973 | Nicolson | 324/637 |
| 4,042,879 | 8/1977 | Ho et al. | 324/58.5 C |
| 4,257,001 | 3/1981 | Partain et al. | 324/58.5 C |
| 4,994,749 | 2/1991 | Davies et al. | 324/637 |
| 5,039,947 | 8/1991 | Kraszewski et al. | 324/58.5 C |
| 5,059,914 | 10/1991 | Lacombe et al. | 324/642 |
| 5,083,090 | 1/1992 | Sapsford et al. | 324/632 |
| 5,384,543 | 1/1995 | Bible et al. | 324/637 |
| 5,497,098 | 3/1996 | Hell et al. | 324/637 |

OTHER PUBLICATIONS

Kittel, C., *Introduction of Solid State Physics*, Second Ed., pp. 157–181 (1957).
Bussey, *Proc. of the IEEE*, vol. 55(6), pp. 1046–1053 (1967).
Lawrence et al., "Automatic System for Dielectric Properties Measurements from 100 KHZ to 1 GZH", Int. Summer Mtg of ASAE, (Jun. 26–29, 1988).
Kraszewski et al., *Trans of the ASAE*, vol. 36(1), pp. 127–134 (1993).
Kraszewski et al., "Microwave Sensors for Simultaneous Measurement of Moisture Content and Mass in Single Peanut Kernels",Int. Winter Mtg of ASAE (Dec. 15–18, 1992).
Kraszewski and Nelson, *Trans. of the ASAE*, vol. 35(4), pp. 1315–1321 (1992).
Kraszewski and Nelson, "Contactless Mass Determination of Arbitrarily Shaped Objects by Microwave Resonator Measurements", Symposium O, Microwave Processing of Materials IV.
Kraszewski and Nelson, "Resonant–Cavity Pertubation Measurement for Mass Determination of the Pertubing Ojbect", IEEE, pp. 1261–1264 (1994).
Kraszewski and Nelson, "Microwave Resonant Cavities for Material Properties Determination", *ANTEM'94*, pp. 391–393 (1994).
Hoppe et al., *IEEE Trans. on Microwave Theory and Techn.*, vol. MIT–28 (12), pp. 1449–1452 (1980).
Rueggenbert, *IEEE Trans. on Microwave Theory and Tech.*, vol. MIT–19(6), pp. 517–521 (1971).
Lakshminarayana et al., *IEEE Trans. on Microwave Theory and Techn.*, vol. MIT–27(7), pp. 661–665 (1979).
Kraszewski et al., *IEEE Trans. on Microwave Theory and Techn.*, vol. 38(7), pp. 858–863, (1990).

(List continued on next page.)

*Primary Examiner*—Michael Tokar
*Attorney, Agent, or Firm*—M. Howard Silverstein; John Fado; Gail E. Poulos

[57] ABSTRACT

A method for nondestructively determining the mass of arbitrarily shaped dielectric objects is disclosed. The object is inserted into a microwave resonant cavity coupled to a microwave radiation source and a measuring circuit. Measurements of shift of resonant frequency and change in the transmission coefficient due to the presence of the object in the cavity are made. The mass is determined from using this information. The process is particularly useful for determining the mass of articles that are too hot or too cold or too fragile to handle and for articles that are irregular or variable in shape.

6 Claims, 11 Drawing Sheets

OTHER PUBLICATIONS

Kraszewski and Nelson, *Canadian Agricultural Engineering*, vol. 34(4), pp. 327–335 (1992).

Talanker and Greenwald, *Rev. Sci. Instrum.* vol. 59(7), pp. 1085–1087 (1988).

Kraszewski et al., *IEEE Trans. on Instrum. and Measurement*, vol. 38(1), pp. 79–84 (1989).

Kraszewski et al., *J. Agric. Engng Res.*, vol. 48, pp. 77–87 (1990).

Harrington, R., *Time–Harmonic Electromagnetic Fields*, p. 321 (1961).

Waldron, R., "Perturbation Theory of Resonant Cavities", *The Theory of Waveguides and Cavities*, pp. 75–82.

Altschuler, H., "Dielectric Constant", *Handbook of Microwave Measurements*, vol. II., pp. 495–548.

Rueggeberg, W., *IEEE Transactions on Microwave Theory and Techniques*, MIT–19(6), pp. 517–521 (1971).

MASS OR WEIGHT DETERMINATION OF ARBITRARILY-SHAPED DIELECTRIC OBJECTS BY MICROWAVE RESONATOR MEASUREMENTS

FIELD OF THE INVENTION

This invention relates to the nondestructive measurement of the mass or weight of arbitrarily shaped objects by electronic measurements on a microwave resonant cavity into which the object is placed. The objects can be of any nonmetallic material which is a relatively poor conductor of electricity.

BACKGROUND OF THE INVENTION

Often in industrial and laboratory practice, there is a need to accurately determine the mass of small dielectric objects of irregular shape. This is difficult to accomplish when objects are too hot, too cold, or too fragile for contact with test equipment. Examples of objects where mass or weight is difficult to measure includes drops of molten polyester or other plastic or polymeric materials; frozen objects such as hydrogen pellets; needle-shaped dielectric objects; and continuous filaments or threads of dielectric materials. A microwave resonant cavity offers a potential solution for these kinds of problems.

A hollow metal cavity is brought into resonance when the wavelength of the coupled electromagnetic wave corresponds with the dimensions of the cavity (Harrington, Time-Harmonic Electromagnetic Fields, p. 321, 1961; Waldron, The theory of Waveguides and Cavities, p. 75, 1967). When a dielectric object is inserted into the cavity, the resonant frequency will shift toward lower frequencies, and the Q-factor of the cavity will decrease. These two effects can be found by sweeping the operating frequency and observing the transmitted energy at the resonant frequency and a number of frequencies around it. Parameters of the cavity depend upon the volume, geometry, and mode of cavity operation, as well as on the permittivity, shape, dimensions, and location of the object inside the cavity. For a given cavity and material sample of regular shape and well-defined dimensions, one can determine the permittivity of the material from equations developed from perturbation theory. This approach has been extensively used for measurement of dielectric properties of materials for many years. Altschuler (Handbook of Microwave Measurements, eds. M. Sucher and J. Fox, p. 530–536, New York: Polytechnic Press, 1963) and Bussey (Proc. IEEE 55(6), 1046–1053, 1967) discussed the use of microwave resonant cavity techniques to measure the microwave dielectric properties of materials by measuring the shift in the resonant frequency and the change in the Q-factor of the cavity.

Microwave resonant cavities have also been used for evaluating the dielectric properties of geometrically defined samples when the cavity is calibrated with dimensionally identical samples of various known permittivities (Rueggeburg, IEEE Trans. Microwave Theory Techn., MTT-19, 517–521, 1971). By measuring a fiber in two resonant cavities, the dielectric constant and diameter of the fiber may be determined, or its moisture content may be determined independent of its diameter or density (Lakshminarayana et al., IEEE Trans. Microwave Theory Techn., MTT-27, 661–665, 1979; Hoppe et al., IEEE Trans. Microwave Theory Techn., MTT-28, 1449–1452, 1980).

Talanker and Greenwald (Rev. Sci. Instru. Vol. 59(7), p. 1085–1087, July, 1988) disclose a method for determining the mass of frozen hydrogen pellets using a resonant microwave cavity. This method uses the resonant cavity to control the frequency of an oscillator. The output of the oscillator is mixed with the output of a second, local oscillator to provide a one-parameter measurement which provides information related to the volume of the hydrogen pellet which passes through the cavity because of the frequency shift resulting from the influence of the object on the resonant frequency of the cavity. This method is only useful for objects of similar shape and dielectric constants. Furthermore, this method requires knowledge of the density of the object in order to determine the mass of the object from the volumetric information provided by the measurement.

A resonant cavity has been applied for determining moisture content in uniformly shaped single seeds by simultaneous measurements of resonant frequency shift and the transmission factor (Kraszewski et al., IEEE Trans. Instrum. Meas., Vol. 38(1), 79–84, 1989; J. Agric. Engin. Res., Vol. 48, 77–87, 1991; U.S. Pat. No. 5,039,947 ('947), 1991). Kraszewski et al., 1989, disclose a nondestructive process for the determination of moisture content in single soybeans using a microwave resonator. A seed is placed in a microwave resonant cavity and the resonant frequency shift and change in Q-factor are measured. This process allows the measurement of moisture content of articles of nearly uniform spherical shape. Kraszewski et al., 1991 and '947 disclose a nondestructive process for determining the moisture content of articles of irregular or variable shape where the irregular or variable-shaped product is inserted into a microwave resonant cavity in a first position and the energy dissipated in the product and the shift or change in the resonant frequency (or wavelength) due to the presence of the product is measured. The orientation of the product is then changed to a second position which is rotated by about n×90 degrees with respect to the maximum field vector (n is an odd integer) and the measurements are repeated.

Kraszewski et al. (American Society of Agricultural Engineers, Paper No. 92-6505, 1992; Trans. ASAE, Vol. 36(1), 127–134, 1993) disclose a method for the simultaneous measurement of moisture content and mass in single peanut kernels, which are also of nearly uniform shape, using microwave resonator measurements of resonant frequency and change in cavity transmission characteristics. The cavity consisted of a section of standard WR-284 rectangular waveguide (inside dimensions: 72×34 mm) 305 mm long operating in the $H_{105}$ ($TE_{105}$) mode. It was coupled with external waveguides through two identical coupling holes 20.6 mm in diameter at each end of the cavity. A PLEXIGLAS™ tube of 15.8 mm outside diameter and 12.4 mm inside diameter was installed in the center of the cavity which supports the peanut kernel at the center of the cavity.

While various methods have been developed for measuring microwave properties of different materials including the mass of uniformly shaped objects, there remains a need in the art for a method for rapid determination of arbitrarily shaped objects independent of their size, density, and dielectric constant, especially objects which can not be handled. The present invention provides a method which is different from prior art methods and solves some of the problems of mass determination of articles, especially those which can not be handled.

SUMMARY OF THE INVENTION

It is therefore an object of the present invention to provide a method for determining mass of perturbing dielectric objects of irregular shape by measuring the shift of resonant frequency and the dissipation of energy.

A further object of the present invention is to provide a method which is independent of the shape or size of the article being measured.

A still further object of the present invention is to provide a method where the article being measured has no physical contact with the measuring instrument.

Further objects and advantages of the invention will become apparent from the following description.

DETAILED DESCRIPTION OF THE INVENTION

Figure 1:
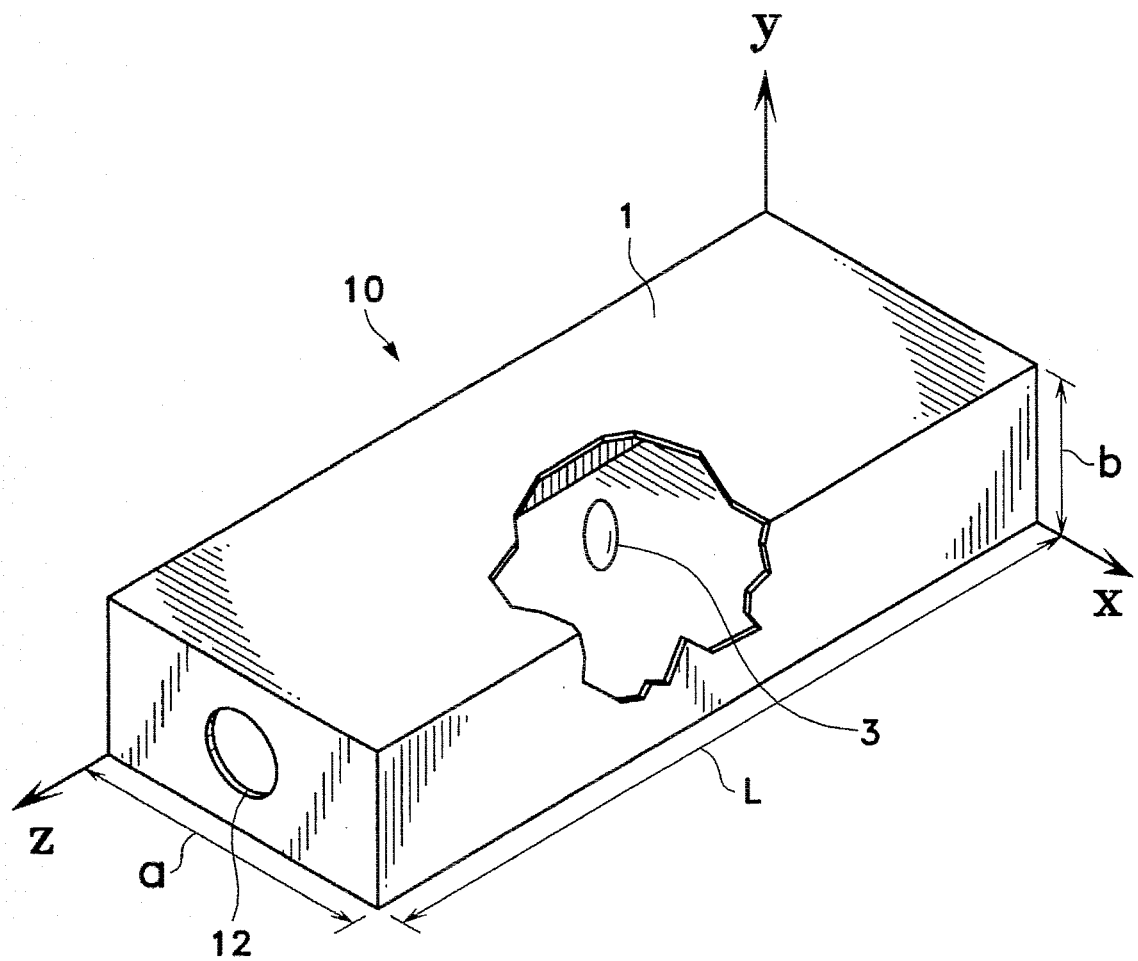
FIG. 1 is a drawing of a rectangular waveguide resonant cavity 10 showing dielectric object 3.

Perturbation theory of microwave resonators has been used extensively for determining the permittivity and permeability of dielectrics and semiconducting materials. Another method for using this technique, determination of the mass or weight of a perturbing object of arbitrary shape when the permittivity and the specific gravity of the material are known, has been discovered. The method can be used to determine mass of objects such as, for example, hydrogen pellets; needle-shaped dielectric objects; and continuous filaments or threads of dielectric materials. The method can also be used, for example, for sorting applications where objects are separated into different mass or weight catergories, especially when undersized and oversized objects would need to be separated. A simple calibration procedure allows experimental determination of numerical coefficients that are used for mass computation during the actual measurement process. Some of the advantages of this novel process are that there is no need for physical contact between the object and the measuring instrument, the measurement is fast, and it does not alter or contaminate the object being measured. The measuring circuit is simple and uses commercially available components. Changes in the resonant frequency and the transmission coefficient of the cavity, when loaded with an object, are the measured values, thus, a high long-term stability of the measuring system is not required. According to cavity perturbation theory, these two quantities are related to the properties of the object material, its shape and its dimensions. Taking the ratio of these two measured variables, a shape-independent function is developed which relates to the square root of the object volume. The process of the invention employs a measuring system that comprises a microwave resonant cavity, means for coupling the cavity to a microwave radiation or energy source, a means for passing objects through the system, and a measuring circuit allowing measurement of the transmission of microwave energy through the cavity, and a data processing unit. The system includes a microwave sweep oscillator and a transmission coefficient measuring circuit that allows the coordinates of the peak of the resonance curve (remnant frequency (F) and transmission coefficient (T)) to be determined with and without the perturbing object. Means for suspending or otherwise removably fixing the position of the article in the cavity is provided. Means is also provided for moving the article through the cavity or cavities. Such movement does not require any support or contact between the article and the cavity. A continuous flow of articles of similar type may be provided so that measurements are taken in a noncontacting way in a cavity. Such means may include a line or guide receiving the articles or the articles may fall freely through the cavity or through a guiding tube therein. An optoelectronic circuit can be used for synchronization of the measuring action with the presence of an object in the measuring space and to provide smooth passage of the object at appropriate speed such as, for example, free fall or pneumatic control, for slower movement, to provide the time needed for the measurement (usually milliseconds). Coordinates of the peak of the resonant curve in analog or in digital form are sent to a data processing unit where the shift of resonant frequency ($\delta F$) and the change in the transmission coefficient ($\delta T$) caused by the presence of the object are calculated. During idle time, parameters of the empty cavity can be measured and stored to be used for reference. The measuring system would acquire the coordinates of the resonant curve to be determined. For a given cavity and material sample of regular shape and well-defined dimensions, the permittivity of the material can be determined. If permittivity of a material is known, the task can be reversed; volume can be sensed, and if the density of the material is known, mass (weight) of an object made of this material can be determined regardless of object shape or dimensions. Thus, masses of objects of irregular shapes and with internal voids can be determined.

Figure 2:
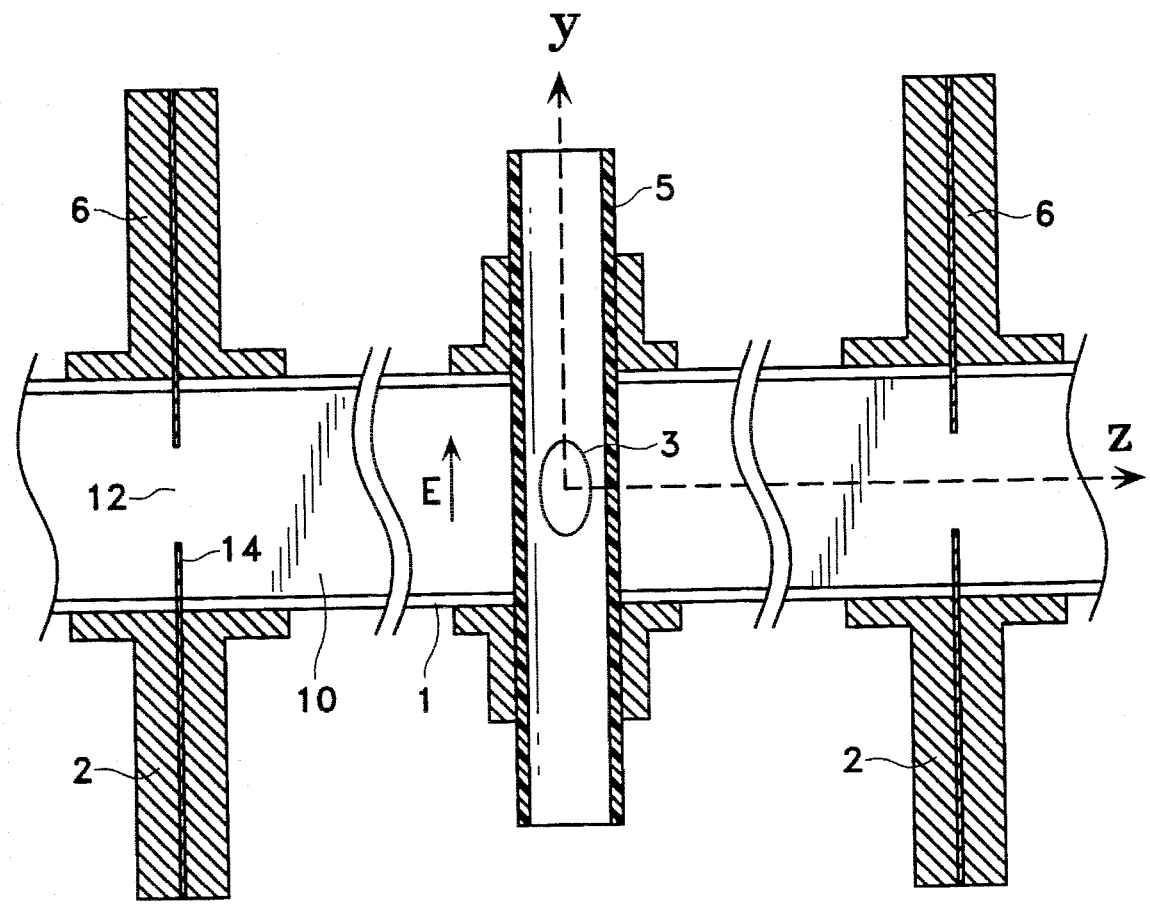
FIG. 2 is a cross-section of the rectangular waveguide resonant cavity 10. Coupling irises 12 are held between waveguide flanges 2 and dielectric object 3 is located in plastic tube 5 at the center of cavity 10.

Any kind of microwave resonator may be used for dielectric mass determination. Parameters of microwave resonant cavities depend upon the volume, geometry, and mode of cavity operation, as well as on the permittivity, shape, dimensions, and location of the object inside the cavity. The size of the cavity and its resonant frequency should always be chosen with a particular material in mind. One example of a resonant cavity is a $TE_{10p}$ ($H_{10p}$) mode cavity 10 which consists of a section of standard rectangular waveguide 1 coupled with external waveguides 6 through two identical coupling irises (holes) 12 cut in short-circuiting metal plates 14 located at each end of the cavity (see FIGS. 1 and 2). FIG. 2 shows a cross-sectional view of cavity 10 with a dielectric tube 5 along the Y axis. Plastic dielectric tube 5 enables the positioning of object 3 at the center of cavity 10. Cavity 10 is located between two waveguide-to-coaxial transitions which allows it to be connected to a computer-controlled automatic network analyzer calibrated in the transmission mode.

Figure 3:
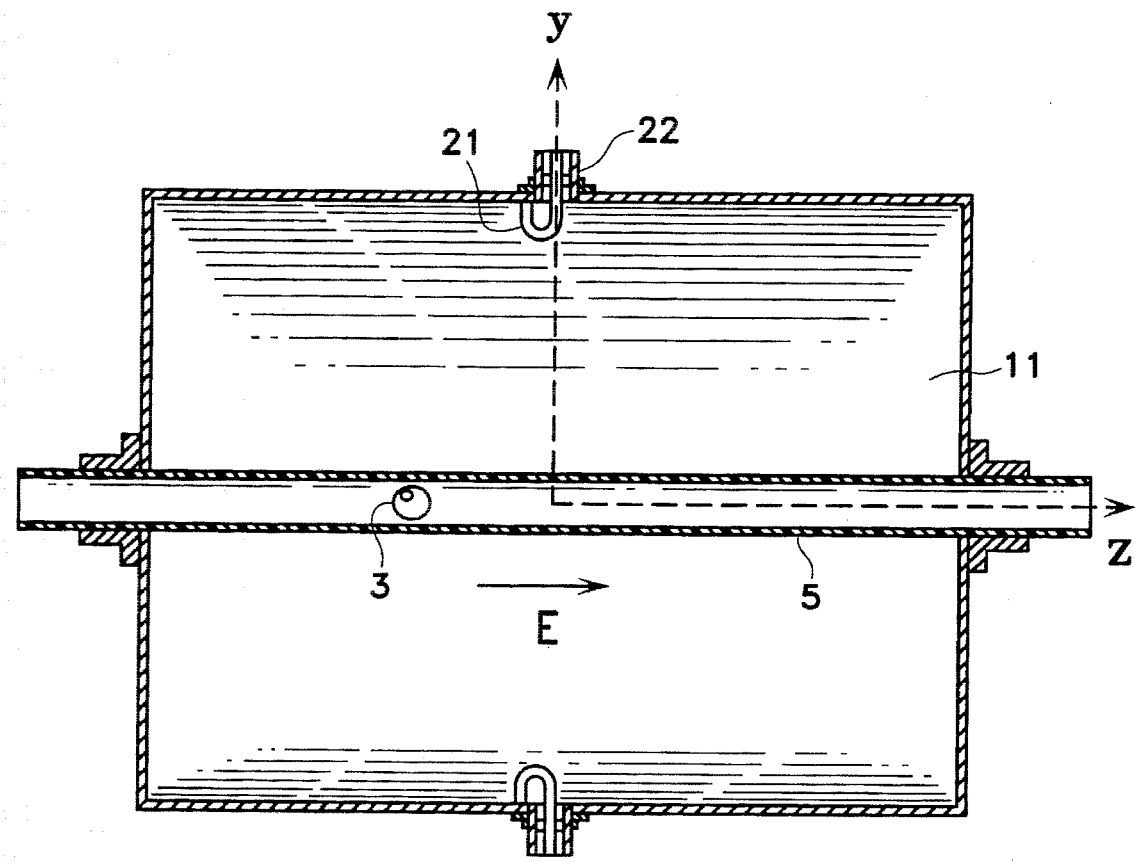
FIG. 3 is a cross-sectional view of the cylindrical waveguide resonant cavity 11. Coupling loops 21 are attached to standard N type connectors 22 and dielectric object 3 is located in a plastic tube 5 along the Z-axis of cavity 11.

A $TM_{010}$ ($E_{010}$) mode cavity 11, shown as a cross-section view in FIG. 3 is a cylindrical cavity. It can be a commercially available 10-gallon steel drum adapted by introducing two coupling 21 loops in the middle of the cylinder and by installing a plastic tube 5 along the axis of cavity 11. Tube 5 enables the positioning of the objects on the axis of the cavity. The resonant frequency (F) of the $TM_{010}$ cylindrical resonator is governed entirely by the radius of cavity. The presence of tube 5 decreases the transmission coefficient (T) of the resonator, but this geometry still permits dielectric object mass measurements. As above for $TE_{10P}$, cavity 11 is connected to a computer-controlled automatic network analyzer calibrated in transmission mode.

Figure 4A:
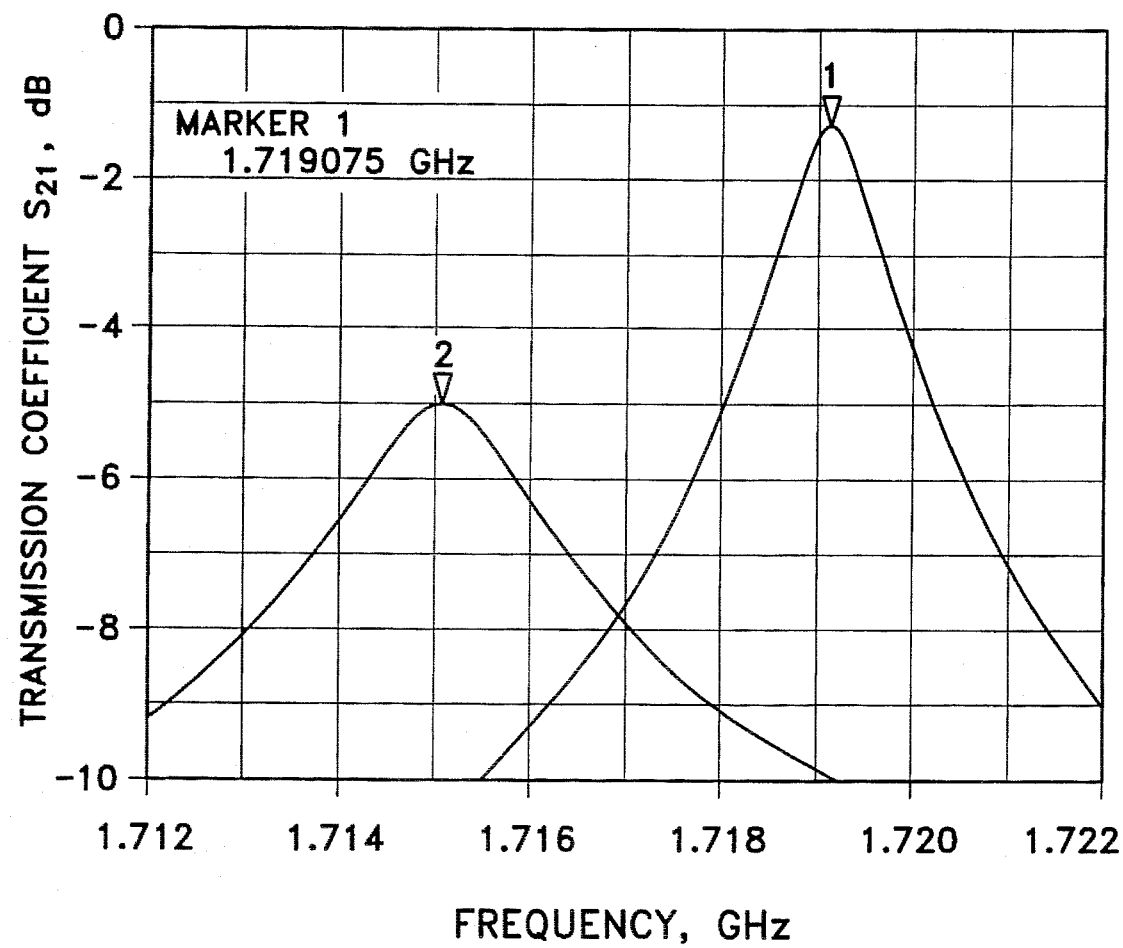
FIG. 4A is a graph of resonance curves at 1.719 GHz for empty cavity (right) and cavity loaded with a dielectric object (left) as seen on the CRT screen.
Figure 4B:
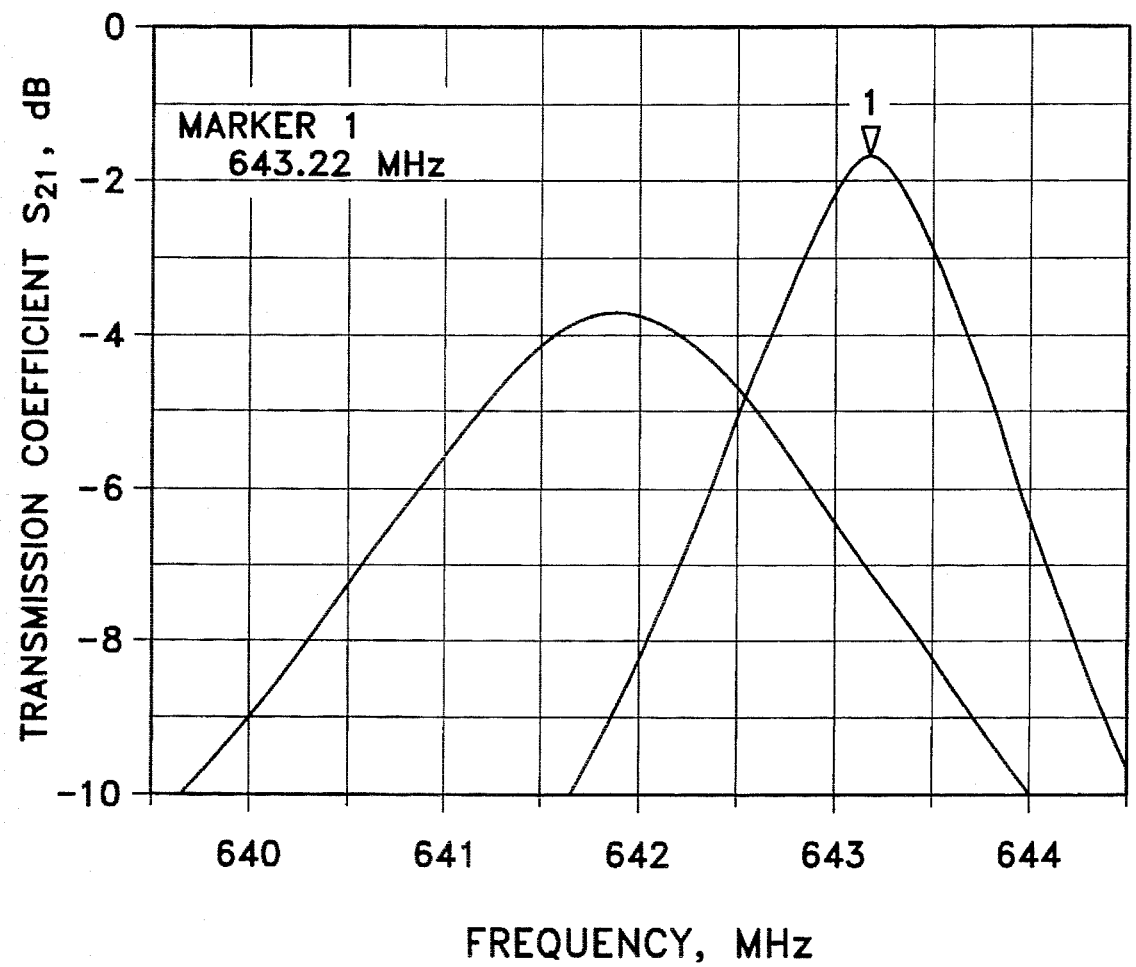
FIG. 4B is a graph of resonance curves at 643.22 MHz for empty (right) and cavity loaded with a dielectric object (left) as seen on the CRT screen.

For either cavity, 10 or 11, the analyzer generates 801 discrete frequencies within a selected range for a given cavity that can vary from 0.8 MHz to 16 MHz. The preferred microwave frequencies depend entirely on the objects to be measured and the size relationship between the cavity and the objects. Some trials will be needed to determine best frequencies for the application. Measurement of the transmission through the cavity is made in increments of 1 to 20 kHz by reading the coordinates of the peak of the resonance curve on a CRT display (FIGS. 4A and 4B). The accuracy of the voltage transmission coefficient measurement (T) in these frequency (F) ranges is determined experimentally to be better than ±0.02 dB.

The microwave frequency and mode of operation of the cavity are not critical but will depend upon the resonant structure dimensions and the article to be measured. Similarly, the microwave resonant cavities may be rectangular or cylindrical in shape or they may be any other suitable resonant structure.

The method can be used for any dielectric object regardless of its shape.

The mass of the dielectric object is determined by tracking the coordinates of the peak of the resonance curve with and without the object, i.e., measuring the shift of resonant frequency (δF) and change in the cavity Q-factor. This provides information that together with a calibration equation is sufficient for the object mass or weight determination.

To determine the resonant frequency (F), the first parameter of the resonance curve (see FIG. 4), the frequency of a signal coupled to the cavity is varied until the maximum transmission is observed. The second parameter of the resonance curve, which is the presentation of the voltage transmission coefficient at resonance, $S_{21}$, as a function of frequency as shown in FIG. 4, is its shape. The apparent Q-factor of the cavity depends upon energy losses in the cavity (its walls, coupling elements, etc.). Thus, when an object is introduced into the cavity, the remnant frequency (F) will decrease and the Q-factor will be lowered because the energy losses in the object cause a broader, flatter resonance curve. Determination of the coordinates of the peak of the resonance curve, with and without an object in the cavity, provides all information necessary to determine the two measured quantifies δF and δT.

The calibration procedure includes inserting a small dielectric object, of known mass, into a microwave cavity in a place where the electric field intensity is maximum. This allows determination of numerical coefficients B and G, in equation (6) below, for materials that make up the objects to be measured. Inserting the object into the cavity changes resonant frequency of the cavity by $$\frac{\delta f}{f_o} = \frac{(f_o - f_s)}{f_o}$$

and its Q-factor $$\delta\left(\frac{1}{Q}\right) = \frac{1}{Q_s} - \frac{1}{Q_o} = \frac{1}{Q_o}\left(\frac{Q_o}{Q_s} - 1\right) = \frac{\delta T}{Q_o},$$

where subscripts o and s refer to the empty cavity and the cavity loaded with a sample object, respectively. The transmission factor $\delta T = 10^k - 1$, where $k = (S_{21o} - S_{21s})/20$, and $S_{21}$ is the voltage transmission coefficient at resonance expressed in decibels. Thus, tracking the coordinates of the resonance curve peak, as shown in FIGS. 4A and 4B, with and without the object, provides enough information to assess the parameters of the object. With a quasistatic approximation, these two measured quantities are related to the material complex permittivity, $\epsilon = \epsilon' - j\epsilon''$, by the following equations:

$$\delta F = \frac{\alpha}{N} f_o \left(1 - \frac{1 + N(\epsilon' - 1)}{[1 + N(\epsilon' - 1)]^2 + (N\epsilon'')^2}\right) \quad (1)$$

$$\delta T = \frac{2\alpha}{N} \frac{Q_o N\epsilon''}{[1 + N(\epsilon' - 1)]^2 + (N\epsilon'')^2} \quad (2)$$

The evaluation of the dielectric constant, $\epsilon'$, and the loss factor, $\epsilon''$, by inversion of these two equations is straightforward for low-loss materials ($\epsilon'' \ll 1$), if the filling factor $\alpha$ and the sample depolarization factor N can be determined exactly. The filling factor $\alpha = 2v_s/v_o$ for a cavity operating in the $TE_{10P}$ mode, where $v_s$ is the volume of the sample and $v_o$ is the volume of the cavity. However, an accurate determination of the depolarization factor N is only possible for a sphere and general ellipsoid. All other object shapes have to be approximated by ellipsoids. For a sphere, $N=\frac{1}{3}$, and for a long thin rod parallel to the electric field vector, $N=0$. In most practical cases, the assumption $\epsilon'^2 \gg \epsilon''^2$ is valid, and the above equations can be written in much simpler form:

$$\delta f \approx \frac{\alpha f_o(\epsilon' - 1)}{[1 + N(\epsilon' - 1)]} = 2f_o(\epsilon' - 1) K \left(\frac{v_s}{v_o}\right) \quad (3)$$

$$\delta T \approx \frac{2\alpha Q_o \epsilon''}{[1 + N(\epsilon' - 1)]^2} = 4Q_o \epsilon'' K^2 \left(\frac{v_s}{v_o}\right), \quad (4)$$

where the shape factor $$K = \frac{1}{1 + N(\epsilon' - 1)}$$

depends upon object shape, orientation and permittivity, as discussed earlier.

From relationships described by Eqns. (3) and (4), a shape-independent function R can be obtained as $$R = \frac{\delta f}{\sqrt{\delta T}} = \frac{\epsilon' - 1}{\sqrt{\epsilon''}} \frac{f_o}{\sqrt{v_o Q_o}} = C\Phi(\epsilon)\sqrt{v_s} \quad (5)$$

where $$\Phi(\epsilon') = \frac{\epsilon' - 1}{\sqrt{\epsilon''}}$$

is a permittivity function, $$C = \frac{f_o}{\sqrt{v_o Q_o}}$$

is a constant for a given cavity, and $v_s$ is the volume of the object. Introducing $$v_s = \frac{m}{\rho} \quad . \quad (20)$$

where m is the mass of the object and $\rho$ is the specific gravity of the solid material, one obtains the expression for a shape-independent function correlated to the object mass:

$$R = \frac{C\Phi(\epsilon)}{\sqrt{\rho}} \sqrt{m} \quad . \quad (6)$$

The ratio R is determined directly from the microwave cavity measurements, and it is a function of the object permittivity, its mass m, specific gravity $\rho$ and a constant describing the empty cavity. Thus, the measurement of the coordinates of the peaks of the resonant curves with and without the object inside the cavity, provides information sufficient for determining the mass of the object of known material. Equation (6) is a calibration equation for the procedure, but the experimental results show that a better fit can be obtained using the calibration equation in the form $$R = G\sqrt{m} + B \quad (7)$$

Both constants B and G are determined experimentally by any regression or curve fitting technique applied to the data points obtained during the calibration procedure. The weight of objects of arbitrary shape and orientation in the cavity can then be determined by measuring the change in resonant frequency ($\delta F$) and the transmission coefficient ($\delta T$) and inserting the values into the following equation, as long as the permittivity and specific gravity of the material remain the same as they are during the calibration process. The equation is $$m = \left(\frac{R - B}{G}\right)^2 \quad . \quad (8)$$

The figure of merit for this calibration procedure is the standard error of calibration (SEC) defined as $$SEC = \sqrt{\frac{1}{n - 1} \sum_{i=1}^{n} \Delta m_i^2} \quad , \quad (9)$$

where n is the number of samples tested and $m_i$ is the difference between object mass obtained from weighing and mass obtained from Eqn. (7) for the i-th object.

The precision of system calibration is affected by an uncertainty of the measuring system. Mass of the dielectric object can be determined in the calibrated system by measuring two cavity parameters, $\delta F$ and $\delta T$, and then using (8) with constants B and G determined experimentally. Introducing the initial quantities into the equation, and assuming that B may be neglected when compared to R, one can obtain the following expression for mass of the object:

$$m = \frac{(f_o - f_s)^2}{f_o^2 \delta T} \frac{\rho v_o f_o}{(f_1 - f_2)} \frac{\epsilon''}{(\epsilon' - 1)^2} \quad , \quad (10)$$

where $f_1$ and $f_2$ are the frequencies at the 3-dB points of the resonance curve, determining the Q-factor of the cavity. However, each term of the equation is measured with a certain accuracy, which to some extent affects the accuracy of the final measurement. Using the law of combination of errors (Hoffmann, Handbook of Measurement Science, ed P.H. Sydeham (New York), 1982, which is herein incorporated by reference), one can develop the equation for relative error in the mass determination from (8) in the following form:

$$\frac{\Delta m}{m} = 3\frac{\Delta f}{f} + \frac{\Delta \rho}{\rho} + \frac{\Delta v_o}{v_o} - \frac{2.303}{20}\left(\frac{\Delta S_{21s}}{S_{21s}} + \frac{\Delta S_{21o}}{S_{21o}}\right) - 2\frac{\Delta \epsilon'}{\epsilon'} + \frac{\Delta \epsilon''}{\epsilon''} \quad , \quad (11)$$

where $\Delta$ denotes the error in the measured variable. Using the average values for all the above variables as determined in the measurements, one may try to evaluate the total uncertainty of the object mass measurement.

The following examples illustrate the use of the invention for contactless mass or weight determinations of arbitrarily-shaped objects. They are intended to further illustrate the invention and are not intended to limit the scope of the invention as defined by the claims.

EXAMPLE 1

Commercially available plastic materials were used to test the microwave balance. These are methyl methacrylate, known as LUCITE™ or PLEXIGLAS™; polyvinylidene fluoride (PVDF) known as KYNAR™; a white, hard resin-based plastic known as DELRIN™; and an opaque low-loss material sold as Nylon. The KYNAR™ is in the form of 12.7 cm thick sheets while DELRIN™ and Nylon are in the form of spheres. PLEXIGLAS™ is in the form of sheets, rods, and spheres. Attempts to determine the permittivity of DELRIN™ and Nylon at desired frequencies failed because of internal irregular voids. Established properties of these materials are listed in Table 1.

TABLE 1

| PARAMETERS OF MATERIALS | | | |
| --- | --- | --- | --- |
| NAME | $\epsilon^*$ at 3 GHz | $\Phi(\epsilon)$ | g/cm³ |
| DELRIN ™ | 3.1 - j 0.148 | 5.46 | 1.41 |
| KYNAR ™ | 2.78 - j 0.18 | 4.19 | 1.76 |
| NYLON | 2.94 - j 0.036 | 10.46 | 1.14 |
| LUCITE ™ | 2.58 - j 0.019 | 11.46 | 1.18 |

Objects with regular shapes were measured and then the shapes were modified by sawing, drilling, and filing to obtain irregular shapes including hollow perforated spheres, disks with irregular and asymmetrical holes, etc. Often objects were inserted into the cavity in two different orientations to check the validity of calibration equation (7). After every step of subsequent modification, each object was weighed on an electric balance with an accuracy of ±0.2 mg. These values were then correlated with the results of the microwave measurements to develop the numerical coefficients B and G in Equation (7).

The objects were measured at the center of four resonant cavities, parameters of which are given below in Table 2.

TABLE 2

PARAMETERS OF RESONANT CAVITIES

| DESCRIPTION MODE OF OPERATION IEC WAVEGUIDE DESIGN | CYLIN- DRICAL $TM_{010}$ | L-BAND RECTANGU- LAR $TE_{109}$ R-14 | LS-BAND RECTANGU- LAR $TE_{109}$ R-22 | S-BAND RECTANGU- LAR $TE_{105}$ R-32 |
|---|---|---|---|---|
| Resonant frequency | 643.3 MHz | 1719.1 MHz | 2456.7 MHz | 3205.8 MHz |
| Q-factor, $Q_o$ | 880 | 1580 | 2600 | 1650 |
| Cross-section | 35.3 cm ID | 16.5 × 8.25 cm | 10.9 × 5.46 cm | 7.2 × 3.4 cm |
| Length | 40 cm | 91.5 cm | 65 cm | 30.5 cm |
| Volume | 40,000 cm$^3$ | 12,465 cm$^3$ | 3,870 cm$^3$ | 749 cm$^3$ |
| Coupling | 1 × 1 cm loops | 4.6-cm ID holes | 3-cm ID holes | 2-cm ID holes |
| C in Eqn. (5) | 0.1083 | 0.3875 | 0.772 | 2.884 |

Figure 5:
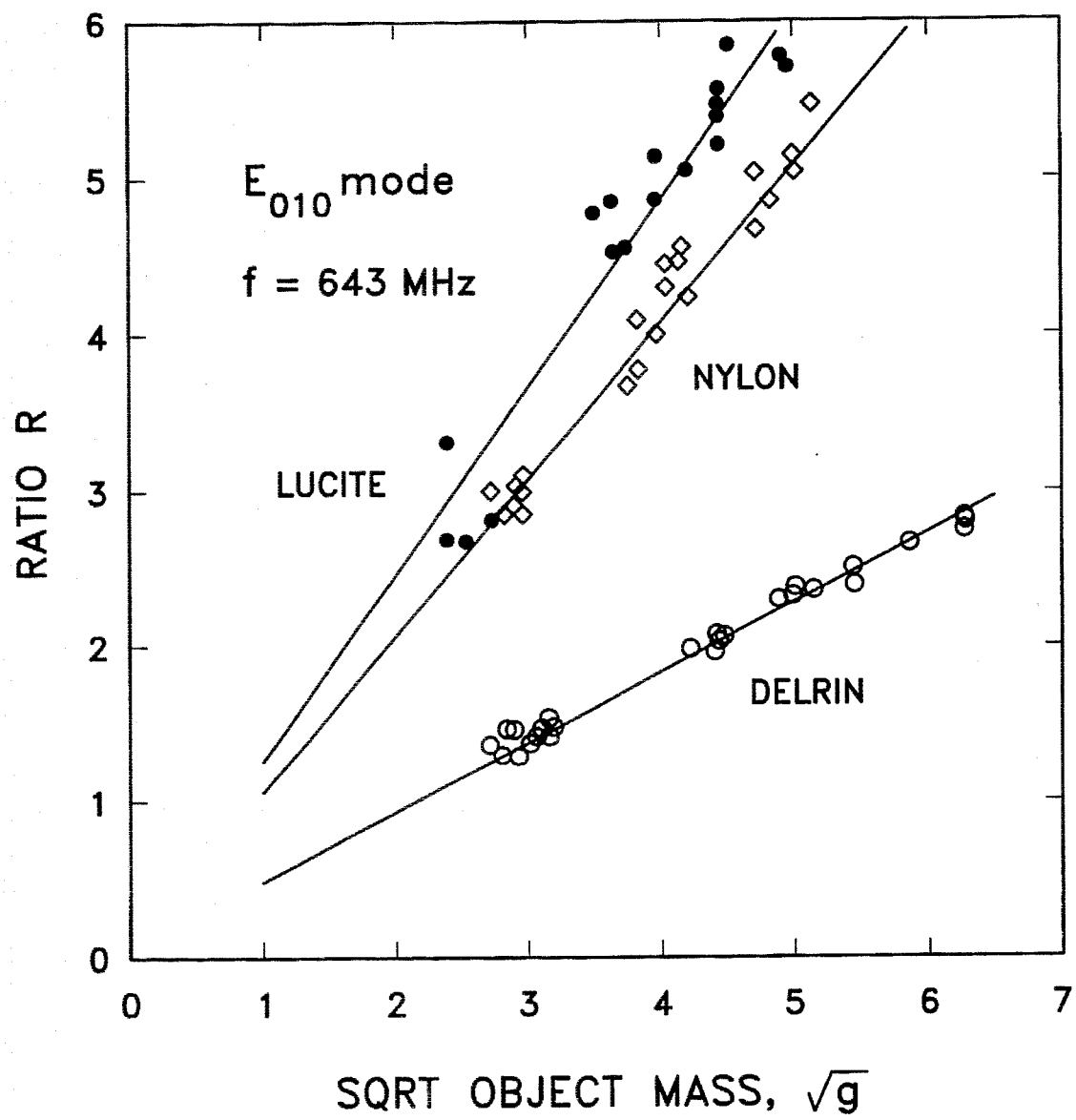
FIG. 5 is a graph of the comparison of R values for three materials tested in the cylindrical cavity as a function of the square root of object mass.
Figure 6:
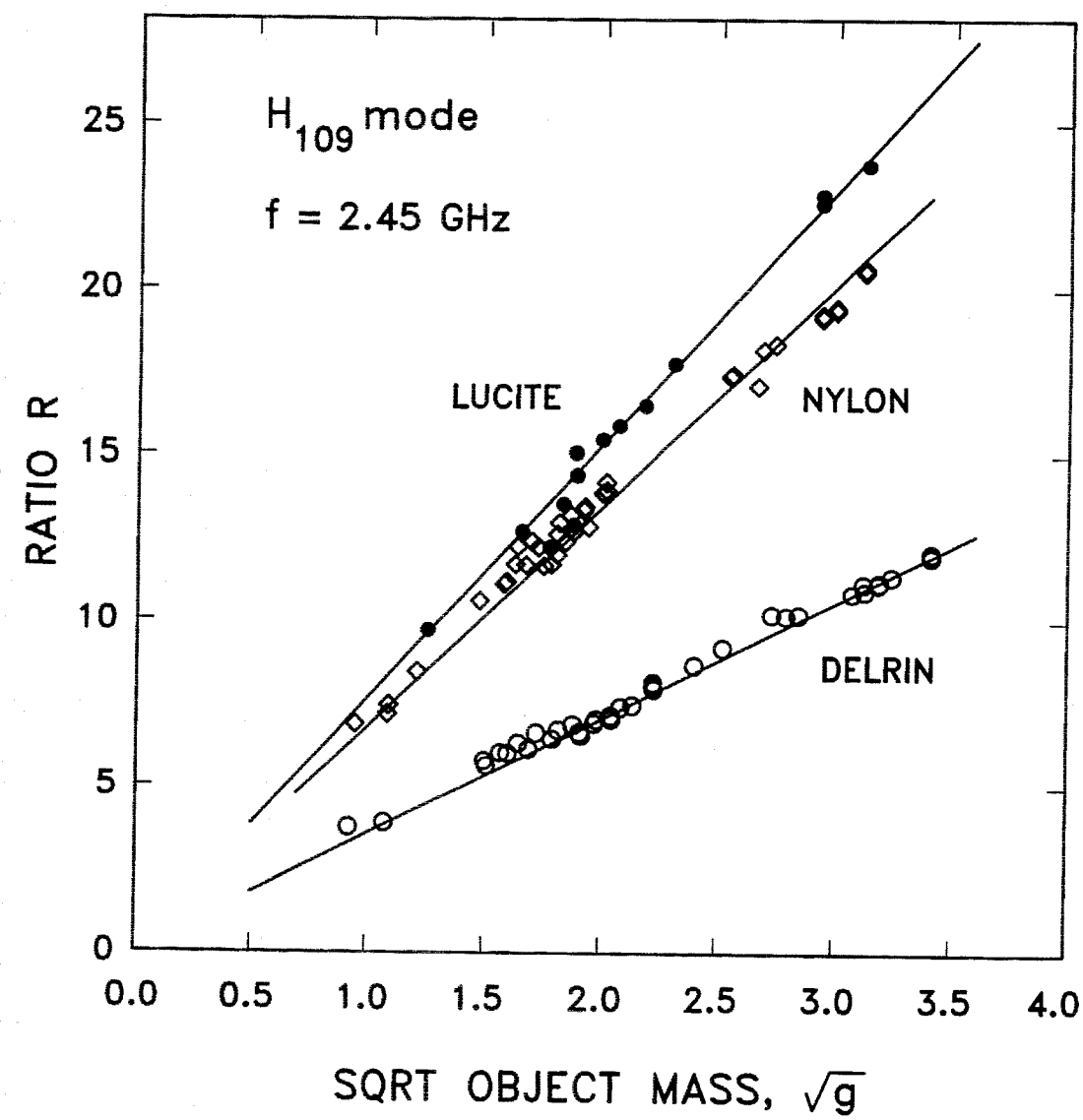
FIG. 6 is a graph of the comparison for three materials tested in the rectangular cavity as a function of the square root of object mass.
Figure 7:
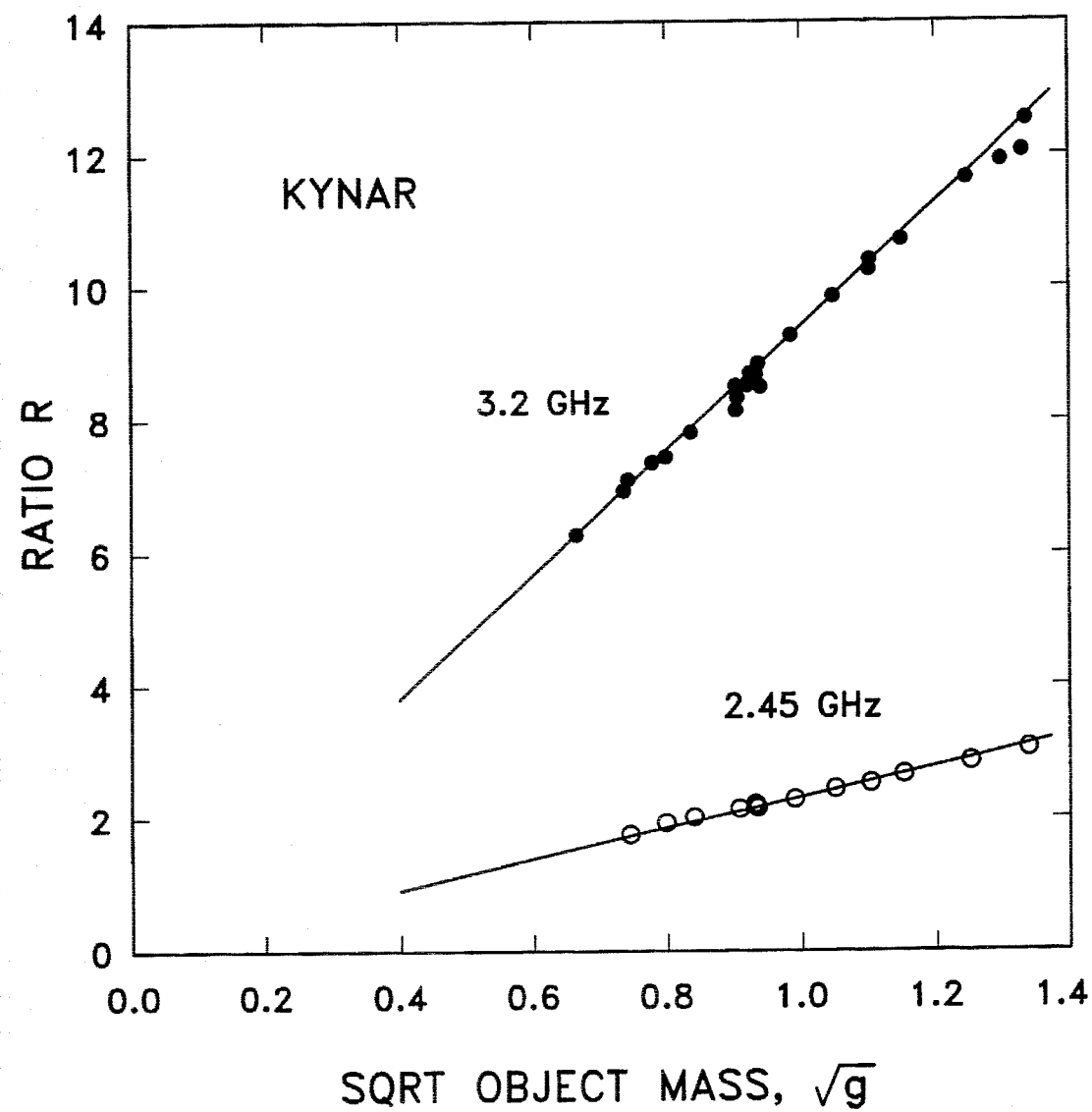
FIG. 7 is a graph of the comparison of R values for KYNAR™ at two frequencies in rectangular cavities as a function of the square root of object mass.

The number of measurements for particular combinations of material and resonator varied from 11 to 71 as certain objects were measured in one cavity with various orientations and in different degrees of modification. All data were fitted with equation (7) above, and numerical coefficients B and G were determined by regression analysis with mass, m, expressed in grams. Results for three materials in the cylindrical cavity operating in the $TM_{010}$ mode at 643 MHz are shown in FIG. 5, and results for a rectangular waveguide cavity operating in the $TE_{109}$ mode at 2,450 MHz are shown in FIG. 6. Data for KYNAR™ samples measured in two rectangular resonant cavities operating at 2.45 GHz and 3.2 GHz are shown in FIG. 7. A summary of results is presented below in Table 3, where numerical coefficients B and G are listed together with the correlation coefficients r determined for data sets illustrated in FIGS. 5 through 7. In the table, n is the number of samples tested for the given combination of material and resonant cavity, and SEC is defined in equation (9) above. The last two columns in Table 3 refer to an average weight of n objects in the series and the SEC is expressed as a percentage of the average mass.

$S_{21}$ is approximately 0.02 db, relative error in data presented in FIG. 5 is, on average, greater than 10%, and for the smallest objects may be even close to 30%. The spread of experimental points is therefore much greater for low-loss LUCITE™ than for DELRIN™, which has losses ($\epsilon''$) 7 to 8 times higher than LUCITE™. To enhance the accuracy of the mass measurement for low-loss materials of a given volume, it is sufficient to use higher frequency in a resonator of smaller volume. In FIG. 6, the spread of the results for smaller LUCITE™ objects is much smaller than at 643 MHz (FIG. 4), and mass determination can be accomplished with an accuracy significantly higher than at 643 MHz. Using equation (11) above, the total relative error in mass determination is $\Delta m/m = 0.0334$ for the DELRIN™ samples having an average mass of 5.8 grams measured in the L-Band rectangular cavity. The average values for all the variables in equation (11) above are:

$f_s \cong f_0 \cong f_1 \cong f_2 \cong 2450$ MHz, $\Delta f = 10$ kHz, $S_{21o} = -6$ dB, $S_{21s} = -9$ dB, $\Delta S_{21} \cong 0.02$ dB; $\rho = 1.41$ g/cm$^3$, $\Delta \rho = 0.02$ g/cm$^3$; $v_o = 3870$ cm$^3$, $\Delta v_o = 10$ cm$^3$, $\epsilon' = 3.1$, $\Delta \epsilon' = 0.05$, $\epsilon'' = 0.015$, $\Delta \epsilon'' = 0.005$.

This error is slightly over 3 percent of the measured mass which agrees well with the value of 4.1% determined experimentally (see Table 3). For an average mass of the objects tested, m=5.78 g, it corresponds to m=0.19 grams.

TABLE 3

SUMMARY OF THE EXPERIMENTAL RESULTS

| MATERIAL | FREQUENCY | n | G | B | r | SEC [g] | Avg. mass [g] | Error [%] |
|---|---|---|---|---|---|---|---|---|
| DELRIN ™ | 643 MHz | 29 | 0.432 | 0.124 | 0.9947 | 1.131 | 20.68 | 5.47 |
| | 1719 MHz | 54 | 1.785 | 0.049 | 0.9971 | 0.216 | 5.71 | 3.78 |
| | 2450 MHz | 71 | 3.418 | 0.250 | 0.9974 | 0.237 | 5.78 | 4.10 |
| NYLON | 643 MHz | 23 | 1.054 | −0.08 | 0.9838 | 1.224 | 15.54 | 7.87 |
| | 1719 MHz | 56 | 3.339 | 0.528 | 0.9946 | 0.270 | 4.94 | 5.47 |
| | 2450 MHz | 63 | 6.139 | 1.279 | 0.9933 | 0.223 | 4.58 | 4.87 |
| LUCITE | 643 MHz | 18 | 1.240 | −0.065 | 0.9601 | 1.736 | 15.39 | 11.3 |
| | 1719 MHz | 11 | 3.971 | 0.275 | 0.9969 | 0.191 | 4.73 | 4.04 |
| | 2450 MHz | 12 | 7.676 | −0.052 | 0.9974 | 0.189 | 5.06 | 3.7 |
| KYNAR ™ | 2450 MHz | 16 | 2.127 | 0.210 | 0.9971 | 0.0229 | 0.99 | 2.3 |
| | 3205 MHz | 29 | 9.245 | 0.052 | 0.9976 | 0.0272 | 0.97 | 2.7 |

As shown in Table 3, the error in mass measuring in low-loss material like LUCITE™ is higher at lower frequencies where available samples cause a decrease in the transmission coefficients $S_{21}$, lower than 0.2 dB. Taking into account that the uncertainty in

EXAMPLE 2

Samples were prepared and are as described above in Example 1. DELRIN™ was available in the form of spheres, but attempts to determine their permitivity at desired frequencies failed because of internal irregular voids. Established dielectric properties of these materials and their densities are listed below in Table 4.

TABLE 4

PARAMETERS OF MATERIALS USED IN THE STUDY (T = 24° C.)

| NAME | PERMITTIVITY AT 3 GHz | $\Phi(\epsilon)$ | g/cm³ |
|---|---|---|---|
| DELRIN ™ | 3.1 - j 0.148 | 5.46 | 1.41 |
| KYNAR ™ | 2.83 - j 0.22[a] | 3.90 | 1.767 |
|  | 2.80 - j 0.21[a] | 3.93 |  |
|  | 2.78 - j 0.17[b] | 4.32 |  |
| LUCITE ™ | 2.58 - j 0.019 | 11.46 | 1.18 |

As in example 1, measurements were taken of objects of regular shapes (spheres, cubes) and then modified by sawing, drilling, and filing to obtain irregular shapes including almost hollow perforated spheres, disks with irregular holes, etc. Objects were inserted into the cavity in two different orientations to check the validity of calibration equation (6) above. After every step of subsequent modification, each object was weighed on an electronic balance with an accuracy of ±0.2 mg. These values were then correlated with the results of the microwave measurements to develop the numerical coefficients in equation (6).

The objects were measured at the center of three rectangular waveguide resonant cavities, parameters of which are given in Table 2 above. The number of measurements for particular combinations of material and resonator varied from 11 to 71, as certain objects were measured in one cavity at various orientations and in different degrees of modification. Samples of each material were measured at at least two frequencies to provide data for comparison of the results. All calibration data are presented in the form of equation (6) above, where m is expressed in grams. Results of the measurements on KYNAR™, DELRIN™, and LUCITE™ samples are presented in FIGS. 7, 8, and 9, respectively. Results for all three materials at 2.45 GHz are shown in FIG. 10. A summary of the experimental results is presented in Table 5 below.

TABLE 5

SUMMARY OF THE EXPERIMENTAL RESULTS

| MATERIAL NAME | FREQUENCY | n | G ± std error | | r | SEC [g] | Avg. mass [g] | Error [%] |
|---|---|---|---|---|---|---|---|---|
| DELRIN ™ | 1719 MHz | 54 | 1.8045 | 0.005 | 0.9971 | 0.2096 | 5.71 | 3.7 |
|  | 2450 MHz | 71 | 3.5178 | 0.0098 | 0.9963 | 0.2374 | 5.78 | 4.1 |
| LUCITE ™ | 1719 MHz | 11 | 4.0937 | 0.0252 | 0.9969 | 0.1805 | 4.73 | 3.8 |
|  | 2450 MHz | 12 | 7.6537 | 0.0402 | 0.9974 | 0.1891 | 5.06 | 3.7 |
| KYNAR ™ | 2450 MHz | 16 | 2.3364 | 0.0105 | 0.9971 | 0.0363 | 0.99 | 3.7 |
|  | 3205 MHz | 29 | 9.340 | 0.0438 | 0.9976 | 0.0248 | 0.97 | 2.6 |

Figure 8:
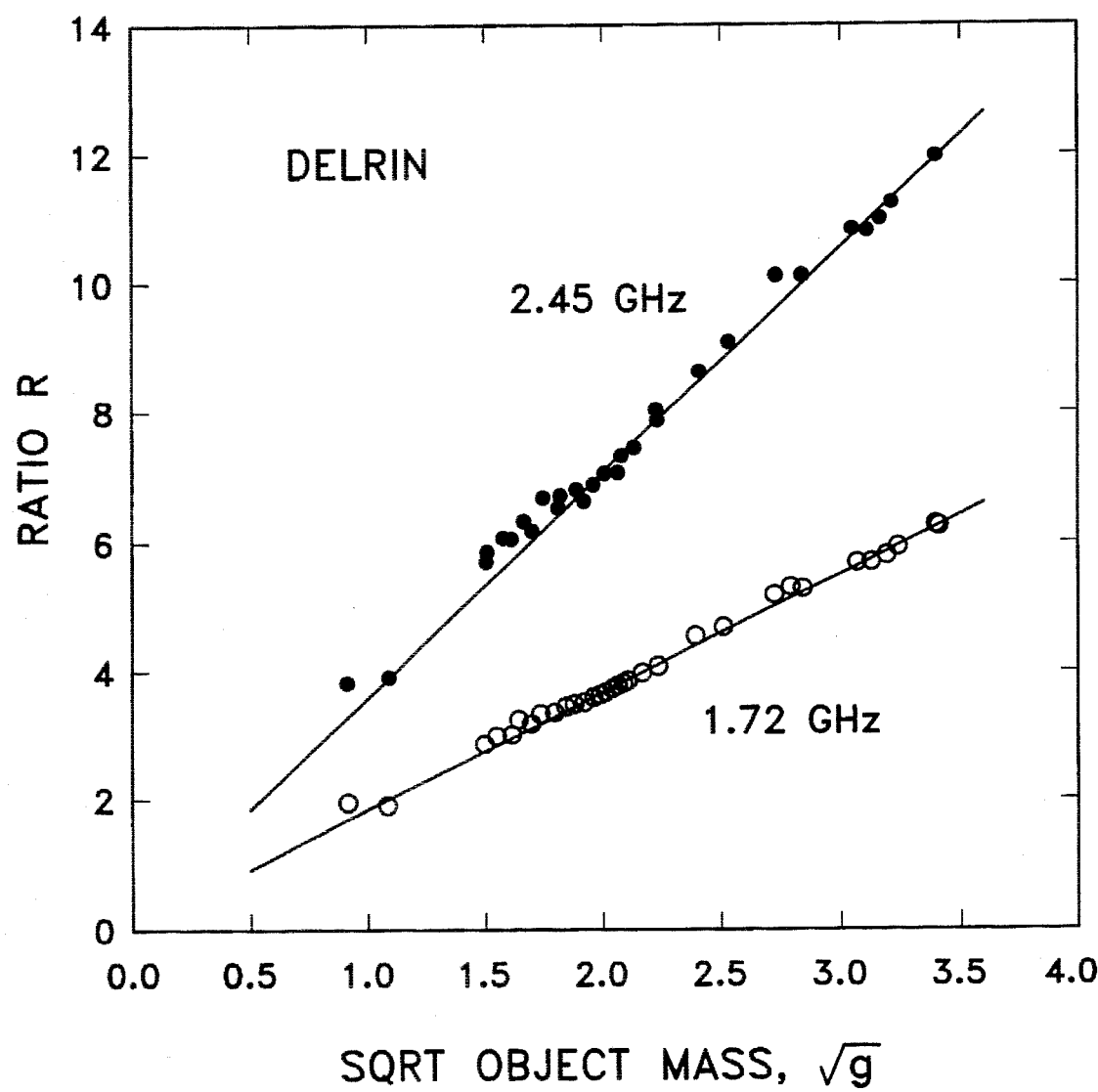
FIG. 8 is a graph of the comparison of R values for DELRIN™ at two frequencies in rectangular cavities as a function of the square root of object mass.
Figure 9:
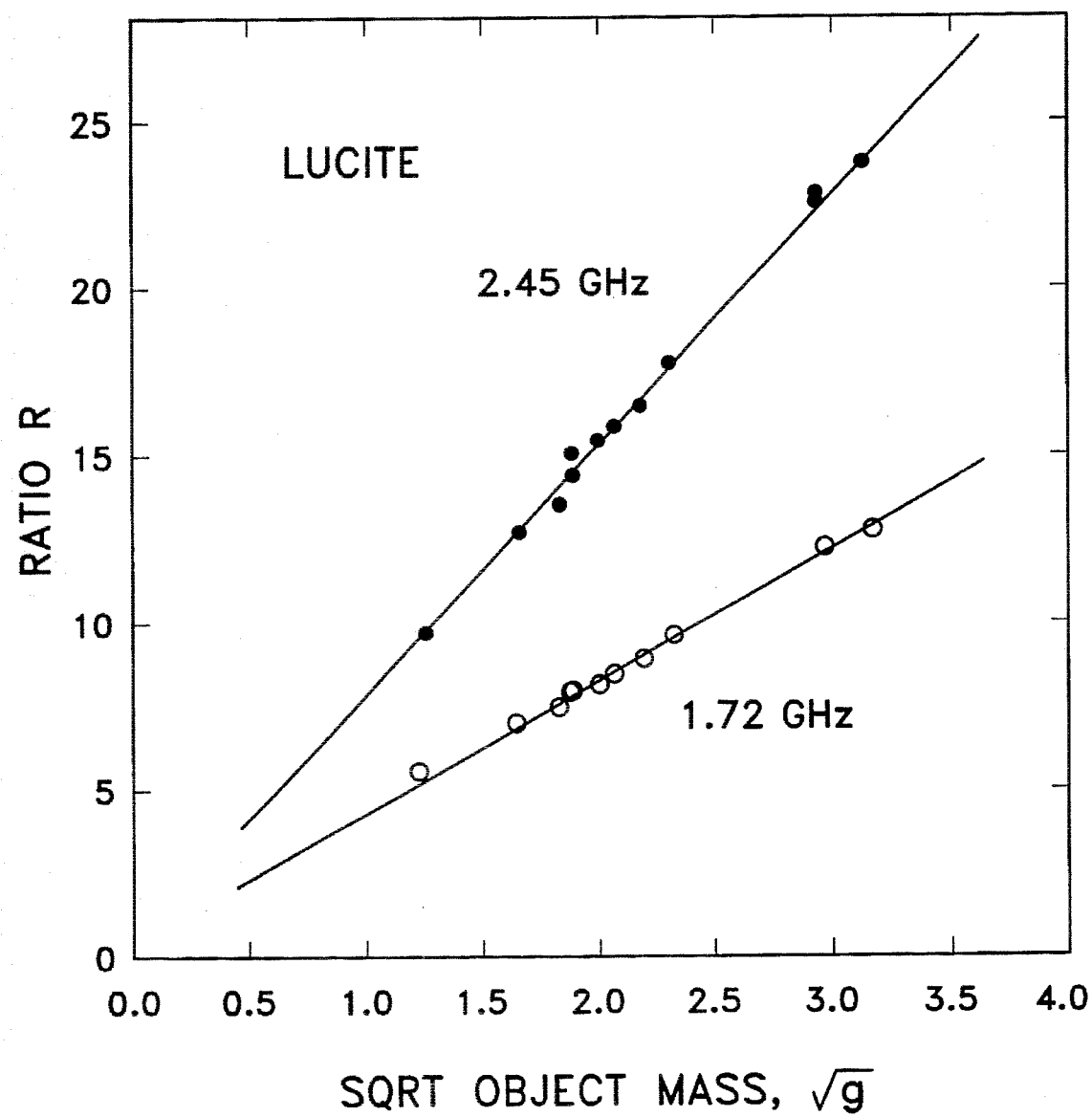
FIG. 9 is a graph of the comparison of R values for LUCITE™ at two frequencies in rectangular cavities as a function of the square root of object mass.
Figure 10:
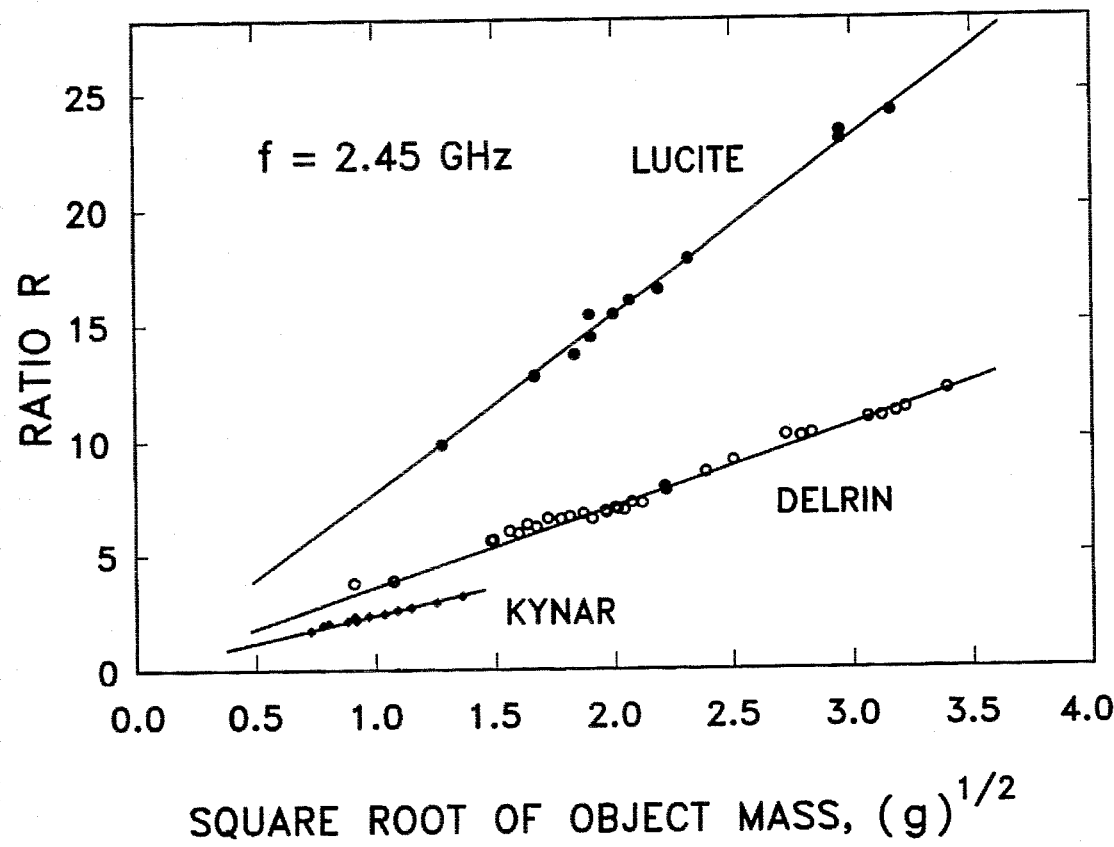
FIG. 10 is a graph of the comparison of R values for LUCITE™, DELRIN™, and KYNAR™ in a rectangular cavity at 2.45 GHz as a function of the square root of object mass.

Numerical coefficients G are listed together with the standard errors and with the correlation coefficient r determined for data sets illustrated in FIGS. 7–9. In the table, n is the number of samples tested at the given frequency, standard error of calibration (SEC) is expressed as in equation (9) where $m_i$ is the difference between object mass from electronic balance weighing and mass obtained from the equation 6 for the i-th object. The last two columns of Table 5 refer to an average weight of n objects in the series and the SEC expressed as a percentage of the average mass. As seen in Table 5, the standard error of calibration for the objects of a given material is less than 4 percent of the object mass.

The foregoing detailed description is for the purpose of illustration. Such detail is solely for that purpose and those skilled in the art can make variations therein without departing from the spirit and scope of the invention.

INDEX OF THE ELEMENTS DESIGNATED BY A NUMERAL

1. Rectangular Waveguide
2. Waveguide Flanges
3. Object
5. Dielectric Tube
6. External Wave Guide
10. $TE_{10P}$ Mode Cavity
11. $TM_{010}$ Mode Cavity
12. Coupling Irises (Holes)
14. Metal Plates
21. Coupling Loops
22. Standard N Type Connectors

We claim:

1. A process for shape- and size-independent measurement of mass or weight of a dielectric object comprising:

a) measuring the resonant frequency of an empty microwave resonator cavity, said cavity being coupled to a microwave radiation source and a measuring circuit allowing measurement of transmission of microwave radiation through said cavity, b) measuring the transmission coefficient of said empty cavity, c) inserting a single object into said cavity, d) measuring the resonant frequency and transmission coefficient of said cavity with said object, e) calculating the shift in remnant frequency, $\Delta F$, and the change in said transmission coefficient, $\Delta T$, caused by inserting said object, f) determing mass of said article using $\Delta F$ and $\Delta T$ obtained in step e) above and the equation:

$$m = (R - B/G)^2$$

wherein m=mass, $R = \Delta F / \sqrt{\Delta T}$, and B and G are constants specific to the material said object is comprised of and to the microwave cavity used to determine B and G for said material.

2. The process of claim 1 wherein said object has no physical contact with said cavity.

3. The process of claim 1 wherein said cavity is rectangular, cylindrical, or any other resonant structure.

4. The process of claim 1 wherein said cavity contains a means for continuous movement of objects through said cavity without contact between the object and said cavity.

5. A system for shape- and size-independent measurement of mass or weight of a dielectric object comprising:

a) a microwave resonant cavity, b) a means for coupling said microwave cavity to a microwave radiation or energy source, c) A microwave radiation or energy source coupled to said microwave cavity, d) a means for passing objects through said cavity, e) a measuring circuit in communication with said cavity wherein said circuit allows the measurement of the transmission of microwave radiation through the cavity, and f) a data processing unit connected to said measuring circuit for receiving coordinates of a resonance curve in analog or digital form for calculating shifts in resonance frequency and change in transmission coefficient caused by inserting a dielectric object into said cavity.

6. The system of claim 5 wherein said microwave resonant cavity is rectangular, cylindrical, or any other resonant structure.

* * * * *